United States Patent [19]

Teckenbrock

[11] Patent Number: 4,807,856
[45] Date of Patent: Feb. 28, 1989

[54] ADJUSTABLE BICYCLE SEAT POST

[76] Inventor: Gary Teckenbrock, 13591 Rd., 104 South, Alamosa, Colo. 81101

[21] Appl. No.: 235,828

[22] Filed: Aug. 18, 1988

Related U.S. Application Data

[63] Continuation of Ser. No. 105,701, Oct. 8, 1987, abandoned.

[51] Int. Cl.⁴ .............................................. B62J 1/02
[52] U.S. Cl. ...................................... 267/132; 188/67; 248/409; 297/345
[58] Field of Search .................. 267/131, 132; 188/67; 248/407, 408, 409; 297/345

[56] References Cited

U.S. PATENT DOCUMENTS

| | | | |
|---|---|---|---|
| 208,823 | 10/1878 | Jenning | 248/409 |
| 578,809 | 3/1897 | Bronson | 248/407 X |
| 585,719 | 7/1897 | Sutton | 403/81 |
| 872,739 | 12/1907 | McDaniel | 248/408 X |
| 1,721,227 | 7/1929 | Manley | 188/67 X |
| 2,170,098 | 8/1939 | Stephenson | 45/91 |
| 2,644,504 | 7/1953 | Vick | 267/132 X |
| 2,652,272 | 9/1953 | Wood | 248/407 X |
| 3,796,460 | 3/1974 | Potchen | 297/211 |
| 3,861,740 | 1/1975 | Tajima et al. | 297/195 |
| 4,150,851 | 4/1979 | Clenfuegos | 297/195 |
| 4,156,391 | 5/1979 | Ubento | 108/136 |
| 4,580,835 | 4/1986 | Angell et al. | 297/195 |

FOREIGN PATENT DOCUMENTS

| | | | |
|---|---|---|---|
| 528023 | 7/1956 | Canada | 248/409 |
| 866544 | 2/1953 | Fed. Rep. of Germany | 248/408 |
| 2341517 | 10/1974 | Fed. Rep. of Germany | 248/407 |
| 3536012 | 4/1987 | Fed. Rep. of Germany | 297/195 |
| 21497 | of 1895 | United Kingdom | 248/408 |
| 451122 | 7/1936 | United Kingdom | 248/408 |

Primary Examiner—George E. A. Halvosa
Attorney, Agent, or Firm—McCaleb, Lucas & Brugman

[57] ABSTRACT

A seat post is axially slidable in a mounting tube member secured in a bicycle-type seat tube or mast. The seat post is biased upwardly by a main spring within the mounting tube member which as an enlarged collar at the top end. The collar supports lock mechanism including a floating gear, a floating latch member, a toggle lever and a supplemental spring. In a locked position, the gear engages the seat post rack, and gear teeth on the latch member lock the gear against rotation. A cable connects the toggle lever to a release handle on the handlebar. Actuation of the handle unlocks the gear from the seat post rack. In another embodiment, the gear is omitted and the latch member engages the seat post rack directly. In another embodiment, the toggle lever is omitted and the cable moves the latch member directly.

15 Claims, 1 Drawing Sheet

U.S. Patent   Feb. 28, 1989   4,807,856
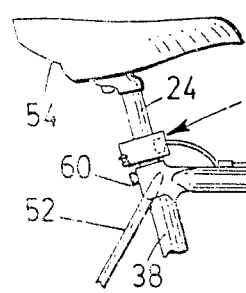
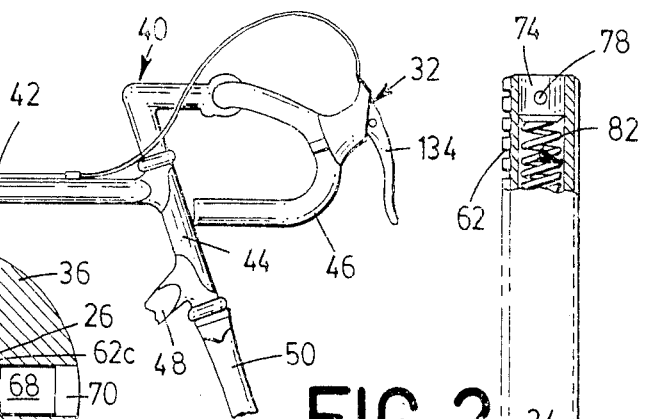
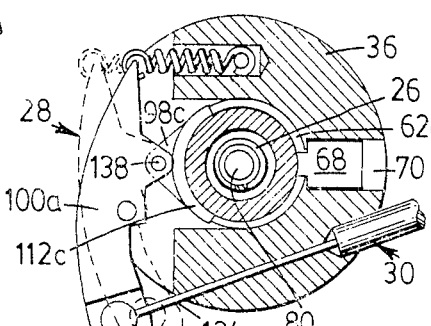
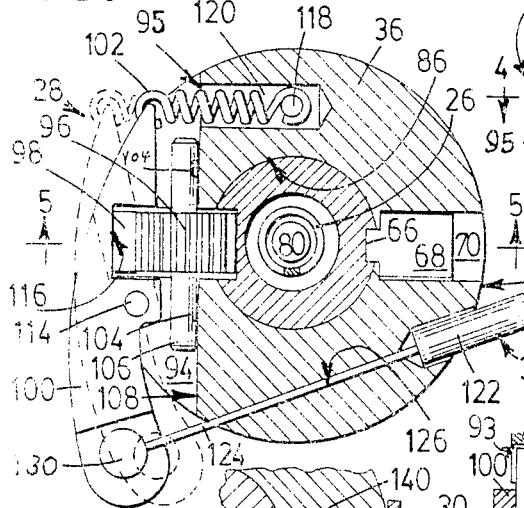
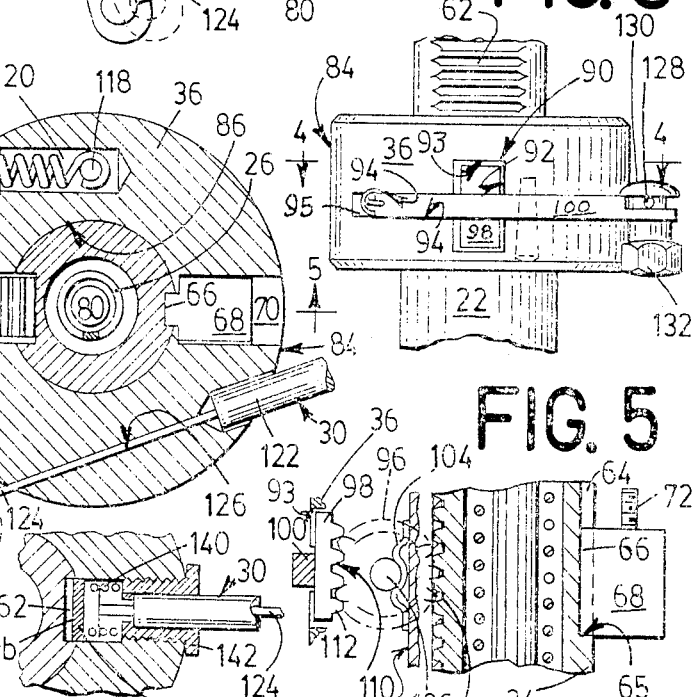
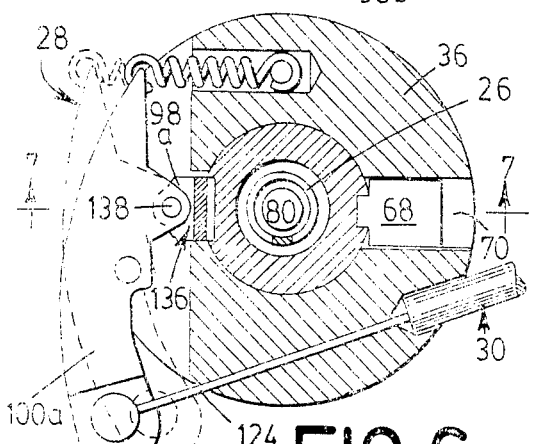
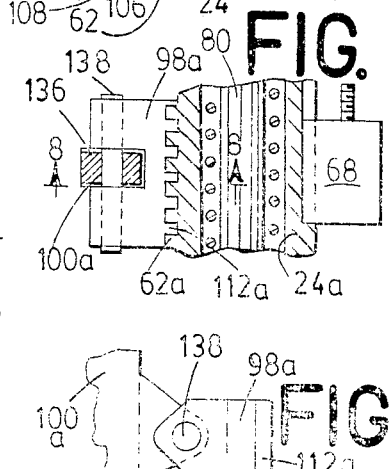
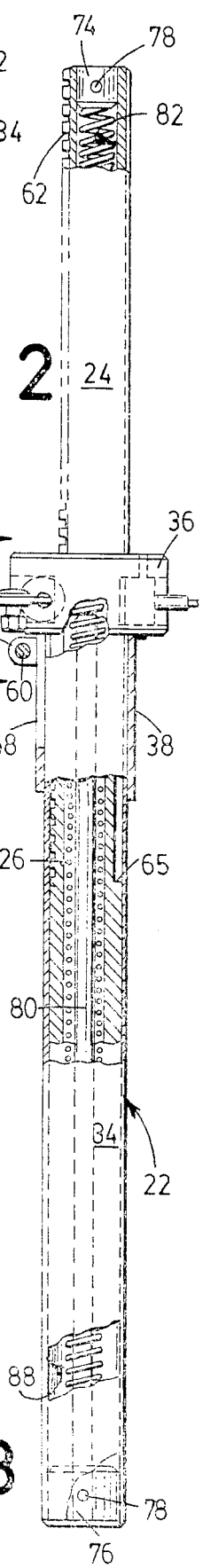

ADJUSTABLE BICYCLE SEAT POST

This is a continuation of co-pending application Ser. No. 105,701 filed on Oct. 8, 1987, now abandoned.

BACKGROUND OF THE INVENTION

This invention relates generally to a saddle for a bicycle, or a stationary cycle-type exerciser, or the like, that can be quickly and easily adjusted to various heights while it is in use.

The optimum height for a bicycle saddle is different when the bicycle is at rest and when it is in use. When the rider mounts and dismounts, or stops for traffic, the saddle should be low enough for his or her feet to touch the ground. However, once the bicycle is moving, the saddle should be raised to a desired level so the rider can apply an effective force on the pedals in the most comfortable position. This is especially important to minimize fatigue on long rides. Further, from the standpoint of both comfort and safety, it is an advantage to raise the saddle to one height for climbing a hill and to lower it for descending. The raised and lowered positions will be specifically different for different persons.

Loose gravel surfaces and curves, especially downhill curves, require lower saddle heights to bring the center of gravity down and thereby improve stability and rider control.

SUMMARY OF THE INVENTION

The primary purpose of the present invention is to provide an adjustable bicycle-type seat post assembly with which the rider can quickly and easily adjust the height of the saddle while mounted thereon.

Another purpose is to provide an adjustable seat post assembly which can be retrofitted into the seat tube of most bicycle or cycle exerciser frames without altering the frame construction with special bolts, clamps, outside springs, or drilled holes.

Another purpose is to provide an adjustable seat post assembly which can be substituted for a standard, non-adjustable seat post, without making any structural changes in the frame seat tube.

Another object is to provide such a completely self-contained adjustable seat post assembly including a mounting tube member with a seat post telescopically adjustable therein, and an enlarged collar on the top of the mounting tube limiting its inserted position and providing support for lock releasing means contained within the collar.

Another purpose is to provide such an adjustable seat post assembly with a remotely actuatable handle located for example at the handlebar where the rider can adjust the seat height quickly and safely without taking his or her eyes off the road or hands off the handlebar.

BRIEF DESCRIPTION OF THE DRAWINGS

Other objects and advantages will be apparent from the following description in connection with the drawings in which:

FIG. 1 is a right side elevational view of a portion of a bicycle using a remotely adjustable seat post assembly according to one embodiment of this invention;

FIG. 2 is an enlarged partially sectioned side view of the seat post assembly illustrated in FIG. 1;

FIG. 3 is a fragmentary enlarged view of FIG. 2 taken in the direction of arrows 3—3;

FIG. 4 is an enlarged horizontal cross-sectional view of FIG. 3 taken on line 4—4;

FIG. 5 is a fragmentary enlarged vertical crosssectional view of FIG. 4 taken on line 5—5;

FIG. 6 is a view similar to FIG. 4 of another embodiment of the invention;

FIG. 7 is a view similar to FIG. 5 and comprises a fragmentary enlarged cross-sectional view of FIG. 6 taken on line 7—7;

FIG. 8 is a fragmentary enlarged view of FIG. 7 taken on line 8—8;

FIG. 9 is a fragmentary cross-sectional view of another embodiment of the invention; and FIG. 10 is a view similar to FIG. 6 of another embodiment of the invention.

Like parts are referred to by like reference numerals.

DESCRIPTION OF THE PREFERRED EMBODIMENTS

Referring now to the embodiment of the invention shown in FIGS. 1-5, the adjustable seat post assembly is generally designated 20 and comprises a mounting tube member 22, a seat post 24, a main spring 26, and lock means generally designated 28 connected by a cable 30 to a remote handle releasing means 32.

The mounting tube member 22 comprises a tubular section 34 at its lower end and an enlarged collar 36 at its upper end. The tubular section is sized across the outside diameter to retrofit exactly into the seat tube or mast 38 of a bicycle 40 or cycle exerciser as a substitute for the usual non-adjustable seat post. The bicycle components shown include a top tube 42, head tube 44, handlebar 46, down tube 48, front fork 50, seat stays 52, and saddle 54, the latter being fastened at the top of the seat post 24 by conventional means.

The mounting tube member 22 is held in place in any conventional manner, for instance, as shown in FIG. 2, by a clamping arrangement comprising a pair of ears 56 flanking an upper split portion 58 clamped by a bolt 60. The collar 36 limits the inserted position of the mounting tube member, and also serves as a support for the lock means 28 and cable means 30.

The lock means 28 is supported on the collar 36 completely independently of the seat tube or mast 38 or any other part of the frame. No alteration of the frame construction by means of special bolts, clamps, or drilled holes, is needed.

The seat post 24 is adjustable up and down, being telescopically slidable within the mounting tube 22. The seat tube has a gear-toothed rack surface 62 formed along one side and a guide groove 64 in the opposite side. The guide loop is engaged by the tongue 66 of a guide plug 68 fastened within a recess 70 in the collar section 36 by a set screw 72. This tongue and groove construction prevents rotation of the seat post and holds the rack surface 62 in alignment with the lock means 28 as will be described. Upwardly outward displacement of the seat post 24 within the mounting tube member 22 is limited by engagement of the groove end 65 with the tongue 66 as shown in FIG. 5.

The main spring 26 is a long, helically-wound compression spring which is compressively interposed between plugs 74 and 76 at the opposite ends of the seat post 24 and mounting tube member 22 respectively. These plugs may be secured by any suitable means such as rivets or pins 78. Spring 26 is internally guided at its lower end by a central guide rod 80 fastened to the lower plug 76 in the stationary mounting tube member, and the spring is externally supported at its upper end by the close proximity of the internal bore 82 of the hollow seat post 24.

The collar section 36 of the mounting tube member, which supports the lock means 28, is generally cylindrical, preferably formed or assembled integral with the lower tubular section 34. The collar has an outer cylindrical surface 84 and an inner bore 86 which is a same-size continuation of the inner bore 88 in the lower section, both of these bores being slidably engaged with the moveable seat post 24. The collar also has an outwardly open, rectangular cross-section recess 90 with side and end walls 92 and 93 respectively (FIG. 3). An outwardly open, transverse groove 95 is defined by spaced, parallel side walls 94,94. Groove 95 intersects recess 90 at right angles. The lock means 28 comprises a floating spur gear 96, a floating latch member 98, a toggle lever 100, a supplemental spring 102, and optional auxiliary spring means comprising a pair of auxiliary springs 104,104.

The spur gear 96 has teeth engageable with the seat tube rack surface 62. The gear 96 is located within the recess 90 and has a central shaft 106 extending on opposite sides of the gear, and located in groove 95 restrained against movement in side directions by the walls 94,94 and restrained against forward movement by the groove bottom wall 108. Although not necessary in every case, the pair of formed-leaf auxiliary springs 104,104 may be positioned between the central shaft and the groove bottom wall 108. These will be formed to bias the gear outwardly to disengage it from the toothed rack surface 62 when the toggle lever 100 is moved away from the latch member 98.

The floating latch member 98 is generally rectangular in shape (FIG. 3) and is positioned within the recess 90 outwardly of the gear 96. It has a second, gear-toothed rack surface 110 consisting of teeth 112 which mesh with the teeth on gear 96.

The toggle lever 100 is guidably, slidably positioned between the walls 94,94 of the transverse groove 95. It is mounted for pivotal movement about a pin 114 which is secured in the collar. It has a squarish notch 116 engaging the latch member 98. Supplemental spring 102 is here illustrated as a tension hooked spring respectively to one end of the toggle lever 100 and anchored to a pin 118 within a transverse spring-receiving bore 120. Spring 102 is considerably stronger than the auxiliary leaf springs 104 and will therefore override the auxiliary springs and normally pull the toggle lever inwardly to a locked position shown in solid lines in FIG. 4 where the gear-toothed rack surface 110 on the latch member 98 engage the gear 96 and the teeth on the gear engage the rack teeth 62 on the seat post. In this locked position, the seat post 24 and the saddle 54 mounted on it are positively held at a selected, adjusted height. Alternatively, a compression spring (not shown), may be substituted for supplemental spring 102. This would be located on the opposite side of pin 114.

The cable 30 comprises an external sheath 122 and a relatively slidable internal wire 124. The end portion of the wire extends through a guide bore 126 formed in the collar 36 and is threaded through a small opening 128 (FIG. 3) in bolt 130 where it is clamped in place by nut 132. The opposite end of the cable is connected to the handle releasing means 32 which is illustrated here as mounted on the handlebar 46. For the present purposes, the actuating handle 32 and cable 30 may be the same as conventionally used to operate bicycle brakes, or special, more compact release means may be used. When the handle lever 134 is moved, the cable wire 124 pulls the toggle lever 100 to its open position shown in broken lines in FIG. 4. This enables the latch member 98 and gear 96 to move outwardly, disengaging the gear from the rack teeth 62 on the seat post which can then be moved downwardly by the rider's weight on the seat, or allowed to rise by the force of the main, elevating spring 26. When the rider releases the handle lever 134, the toggle lever 100 is returned by the supplemental spring 102 to the locked position shown in solid lines in FIG. 4 where the teeth on gear 96 engage seat post rack teeth 62. The seat 54 will remain positively fixed at a new level until the release lever 134 is reactivated.

The embodiment shown in FIGS. 6, 7, and 8 is similar to that shown in FIGS. 1-5 except that the latch member 98a, corresponding to latch member 98, is connected directly to the toggle lever 100a; and the threads in the rack surface 62a on the seat post 24a, and on the latch member 98a are square (FIG. 7) to provide a more positive lock. The toggle lever 100a fits into a groove 136 in latch member 98a and is directly connected to the toggle lever 100a by a pivot pin 138 extending lengthwise through member 98a. No counterpart of the floating gear 96 is used in the FIG. 6-8 embodiment. Otherwise, the components of the FIG. 1-5 and FIG. 6-8 embodiments are the same and are indicated by the same reference numerals. The rack teeth 62a and 112a on the seat post 24a and latch member 98a respectively are disengaged by actuating handle lever 134 after which the seat level can be adjusted up or down in the manner described above for the FIG. 1-5 embodiment.

In the embodiment shown in FIG. 9, the cable wire 124 is connected directly to a latch member 98b which has a gear-toothed rack surface 110b directly engageable with the gear-toothed rack surface 62 on the seat post. A supplemental spring 140 is compressibly interposed between the latch member 98b and a screw-threaded cable coupling 142. Actuation of the handle lever 134 retracts the cable wire 124 and disengages the gear-toothed rack surface 110b on the latch member 98b from the rack surface 62b on the seat post. At this time the seat post is unlocked and the seat level can be adjusted up or down and locked in a new position as described for the previous embodiments.

The embodiment shown in FIG. 10 is the same as that shown in FIGS. 6, 7, and 8 with the following exceptions. Instead of the latch member 98a, there is a locking wafer 98c connected directly to the toggle lever 100a by pivot pin 138. The locking wafer has one or more arcuate rack teeth 112c engaged within one or more grooves 62c milled for example at 3 mm spacings along the seat post 24c.

The embodiments described and shown to illustrate the present invention have been necessarily specific for purposes of illustration. Alterations, extensions, and modifications would be apparent to those skilled in the art. The aim of the appended claims therefore is to cover all variations included within the spirit and scope of the invention.

The embodiments of the invention in which an exclusive property or privilege is claimed are defined as follows:

1. A remotely adjustable bicycle-type seat post assembly comprising:
   a mounting member sized to be secured in a generally upright position within the seat tube of a bicycle or like apparatus, said mounting tube member having an enlarged collar portion at its upper end for limiting its inserted position in a bicycle seat tube;

an axially moveable seat post telescopically adjustable to different levels within the mounting tube member and adapted to support a saddle or seat at the upper end thereof;

a main spring within the mounting tube member urging the seat post upwardly relative to the mounting tube member;

a gear-toothed rack surface extending lengthwise along said seat post;

lock means including a floating gear, a floating latch member, a toggle lever, and a supplemental spring;

said floating gear being loosely positioned in a first recess in said collar and moveable to and from a locked position engaged with said gear-toothed rack surface;

said floating latch member being loosely positioned in said recess in said collar outwardly of said gear for movement with said gear and having gear teeth engaged with said gear opposite the rack surface;

said toggle lever being pivotally mounted in a second recess interesecting said first recess in said collar and having portions engageable respectively with the latch member and with a cable connection for a remote release cable; and said supplemental spring being connected between the toggle lever and the collar to bias the gear towards its said locked position.

2. A remotely adjustable bicycle-type seat post assembly according to claim 1 including handle releasing means adapted to be located remote from the mounting tube member and seat post and constructed and arranged to engage the cable connection and to enable movement of the toggle lever against the bias of the supplemental spring by a rider while using said bicycle or like apparatus.

3. A remotely adjustable bicycle-type seat post assembly according to claim 1 including handle releasing means adapted to be located remote from the mounting tube member and seat post, and means for moving the toggle lever in response to actuation of the handle releasing means.

4. A remotely adjustable bicycle-type seat post assembly according to claim 3 in which said means for moving the toggle lever in response to actuation of the handle releasing means is cable means attached to the cable connection.

5. A remotely adjustable bicycle-type seat post assembly according to claim 1 in which said toggle lever is slidably guided within said second recess.

6. A remotely adjustable bicycle-type seat post assembly according to claim 5 in which said floating gear has a central shaft within said groove to guide said gear for floating movement to and from its said locked position engaged with said gear-toothed rack surface on the seat post.

7. A remotely adjustable bicycle-type seat post assembly according to claim 1 including auxiliary spring means biasing said gear for movement away from said locked position, said supplemental spring means being relatively stronger and effective to overcome the auxiliary spring means.

8. A remotely adjustable bicycle-type seat post assembly comprising:

a mounting tube member extending along a central axis and being sized to be secured in a generally upright position within the seat tube of a bicycle or like apparatus, the mounting tube member having an enlarged collar at its upper end for limiting its inserted position in a bicycle seat tube;

an axially moveable seat post telescopically adjustable to different levels within the mounting tube member and adapted to support a saddle or seat at the upper end thereof;

a main spring within the mounting tube member urging the seat post upwardly relative to the mounting tube member;

a gear-toothed rack surface extending lengthwise along the seat post;

lock means including a loose floating gear-toothed member, a toggle lever, and a supplemental spring, all contained in said collar within recess means comprising first, second, and third interconnected recesses, the first recess extending through the collar from an open outer end to an open inner end communicating with the seat post, along a line extending substantially radially to the central axis;

the floating gear-toothed member being loosely guided in the first recess for movement to and from a locked position engaged with the gear-toothed rack surface;

the second recess comprising an outwardly open groove intersecting the first recess, the second recess being defined between side walls extending transverse to the central axis; the toggle lever being pivotally mounted within the second recess and having opposite portions respectively engaged with the floating gear-toothed member and with a cable connection for a remote release cable;

the third recess comprising a bore within the collar connected with the second recess; and the supplemental spring being positioned in the third recess and connected between the toggle lever and the collar to bias the gear-toothed member toward the locked position.

9. A remotely adjustable bicycle-type seat post assembly according to claim 8 in which the second recess is narrower than the first recess measured in a direction parallel to the central axis.

10. A remotely adjustable bicycle-type seat post assembly according to claim 9 in which the toggle lever is a flat plate substantially thinner than the floating gear-toothed member measured in a direction parallel to the central axis.

11. A remotely adjustable bicycle-type seat post assembly according to claim 8 in which the first recess is substantially rectangular in cross-section, the floating gear-toothed member has a corresponding rectangular cross-section, and the toggle lever is a flat plate substantially thinner than the floating gear-toothed member measured in a direction parallel to the central axis.

12. A remotely adjustable bicycle-type seat post assembly according to claim 8 in which the first and second recesses are coplanar.

13. A remotely adjustable bicycle-type seat post assembly according to claim 8 in which the second recess is narrower than the first recess measured along a line parallel to the central axis, and the toggle lever is correspondingly narrower than the floating gear-toothed member measured along the same line, and the first and second recesses are coplanar.

14. A remotely adjustable bicycle-type seat post assembly according to claim 8 in which the toggle lever is slidably guided between the side walls defining the second recess.

15. A remotely adjustable bicycle-type seat post assembly according to claim 8 in which the collar has a bore aligned with the toggle lever to guide a cable from the toggle lever to a remote operator.

* * * * *

UNITED STATES PATENT AND TRADEMARK OFFICE
CERTIFICATE OF CORRECTION

PATENT NO. : 4,807,856
DATED : February 28, 1989
INVENTOR(S) : Gary Teckenbrock

It is certified that error appears in the above-identified patent and that said Letters Patent is hereby corrected as shown below:

Column 2, line 53, "loop" should be --groove--.

Column 5, line 1, delete "portion"

Signed and Sealed this

Twenty-second Day of August, 1989

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,807,856
DATED : 02/28/89
INVENTOR(S) : Gary Teckenbrock

It is certified that error appears in the above-identified patent and that said Letters Patent is hereby corrected as shown below:

Column 4, line 66, "mounting member" should be – mounting tube member–

Signed and Sealed this

Twenty-eighth Day of November 1989

Attest:

JEFFREY M. SAMUELS

*Attesting Officer*  *Acting Commissioner of Patents and Trademarks*